US009346479B1

(12) United States Patent
Ransil (10) Patent No.: US 9,346,479 B1
(45) Date of Patent: May 24, 2016

(54) TRAVEL STROLLER SEAT SUPPORT ARTICULATED FOLDING MECHANISM (71) Applicant: ARTSANA USA, INC., Lancaster, PA (US)

(72) Inventor: Matthew J. Ransil, Richland, PA (US)

(73) Assignee: ARTSANA USA, INC, Lancaster, PA (US)

( * ) Notice: Subject to any disclaimer, the term of this patent is extended or adjusted under 35 U.S.C. 154(b) by 0 days.

(21) Appl. No.: 14/660,860

(22) Filed: Mar. 17, 2015

(51) Int. Cl.
*B62B 7/08* (2006.01)
(52) U.S. Cl.
CPC ....................................... *B62B 7/08* (2013.01)
(58) Field of Classification Search
CPC ............ B62B 3/02; B62B 3/022; B62B 7/06; B62B 7/08; B62B 7/10; B62B 7/062; B62B 7/064; B62B 2301/0465
USPC .......................................... 280/642, 643, 650
See application file for complete search history.

(56) References Cited

U.S. PATENT DOCUMENTS

| | | | | |
|---|---|---|---|---|
| 3,736,021 | A * | 5/1973 | MacLaren | 297/42 |
| 4,732,406 | A * | 3/1988 | Kassai | 280/642 |
| 5,421,603 | A * | 6/1995 | Wills et al. | 280/642 |
| 5,562,330 | A * | 10/1996 | Jane Cabagnero | 297/42 |
| 5,725,238 | A * | 3/1998 | Huang | 280/642 |
| 6,152,476 | A | 11/2000 | Huang | |
| 7,118,121 | B2 * | 10/2006 | Cheng et al. | 280/642 |
| 7,410,187 | B2 * | 8/2008 | Hartenstine et al. | 280/643 |
| 7,422,230 | B2 * | 9/2008 | Chuan | 280/642 |
| 7,832,756 | B2 * | 11/2010 | Storm | 280/642 |
| 7,862,054 | B2 | 1/2011 | Fiore, Jr. | |
| 8,061,732 | B2 | 11/2011 | Song et al. | |
| 8,087,689 | B2 * | 1/2012 | Fritz et al. | 280/647 |
| 8,485,547 | B2 * | 7/2013 | Hsu | 280/647 |
| 8,523,218 | B2 | 9/2013 | Doucette et al. | |
| 8,590,919 | B2 * | 11/2013 | Yi | 280/642 |
| 8,602,442 | B2 * | 12/2013 | Li | 280/647 |
| 8,870,213 | B1 | 10/2014 | Xu | |
| 8,888,123 | B1 * | 11/2014 | Cheng | 280/643 |
| 8,936,267 | B2 * | 1/2015 | Li et al. | 280/642 |
| 8,979,114 | B2 * | 3/2015 | Cheng et al. | 280/642 |
| 8,991,854 | B2 * | 3/2015 | Greger et al. | 280/650 |
| 9,085,312 | B2 * | 7/2015 | Liu | |
| 2004/0222615 | A1 * | 11/2004 | Cheng et al. | 280/642 |
| 2005/0098983 | A1 * | 5/2005 | Cheng et al. | 280/642 |
| 2005/0258620 | A1 * | 11/2005 | Pike et al. | 280/647 |
| 2007/0052208 | A1 * | 3/2007 | Chen et al. | 280/642 |
| 2008/0073879 | A1 * | 3/2008 | Chen et al. | 280/642 |

(Continued)

*Primary Examiner* — Hau Phan
*Assistant Examiner* — Jacob Meyer
(74) *Attorney, Agent, or Firm* — Patent Law Associates; Andrew D. Mead (57) ABSTRACT

A foldable stroller frame having right and left front, right and left rear legs, and right and left handle supports joined at a right and left folding joints in a manner permitting folding movement about a folding axis between deployed and folded positions. A seat panel connects the front legs and includes a movable portion being movable between first and second positions. A seat back frame is connected to the movable portion at a seat back pivot. Spacing between the seat back pivot and the folding axis is dependent upon the position of the movable portion. When in the first position, the spacing is greatest and precludes frame folding due to interference between the seat back frame and a transverse element between the handle supports. When in the second position, spacing is minimized and frame folding is permissible without interference between the seat back frame and the transverse element.

18 Claims, 9 Drawing Sheets

(56) References Cited

U.S. PATENT DOCUMENTS

| | | | |
|---|---|---|---|
| 2008/0290631 A1* | 11/2008 | Pike et al. | 280/647 |
| 2010/0025968 A1* | 2/2010 | Fritz et al. | 280/647 |
| 2010/0237590 A1* | 9/2010 | Kane | 280/649 |
| 2011/0241313 A1* | 10/2011 | Homan et al. | 280/647 |
| 2011/0241395 A1* | 10/2011 | Homan et al. | 297/250.1 |
| 2011/0291389 A1* | 12/2011 | Offord | 280/650 |
| 2012/0032419 A1* | 2/2012 | Li | 280/647 |
| 2012/0104729 A1* | 5/2012 | Yi | 280/642 |
| 2013/0134692 A1* | 5/2013 | Cheng et al. | 280/642 |
| 2013/0156490 A1* | 6/2013 | Schroeder | 403/104 |
| 2013/0207369 A1 | 8/2013 | Pollack | |
| 2013/0240577 A1* | 9/2013 | Li et al. | 224/159 |
| 2014/0327233 A1* | 11/2014 | Greger et al. | 280/650 |

\* cited by examiner

TRAVEL STROLLER SEAT SUPPORT ARTICULATED FOLDING MECHANISM

BACKGROUND OF THE INVENTION

The present invention relates generally to the field of child strollers. More particularly, the present invention relates to a foldable stroller that includes an articulated mechanism in the folding handle which repositions the backrest support for improved frame clearance as the stroller is folded.

Even though foldable strollers have been in production for quite some time, efforts to improve the ease with which they may be folded for stowage and increase the compactness of the folded stroller constantly continues. Mechanisms to coordinate folding movement of the legs, handle extensions, and various soft goods supports as the stroller is folded and easily-releasable latches allowing the folding operation to commence have dramatically improved the ease of use over the years. One area of focus has been in mechanisms that allow the stroller to be collapsed for stowage requiring only one hand to operate. Coordination of the movement of numerous frame members is necessary to permit stroller frame folding without interference between closely situated frame members.

It would be advantageous to provide a foldable stroller that can be folded using a simple, one-handed operation which releases the latch, and allows the stroller frame in a coordinated manner without interference between closely disposed frame members.

SUMMARY OF THE INVENTION

According to one embodiment of the present invention, a stroller having at least forwardly extending right and left side front wheel supports and upwardly extending right and left side handle supports terminating in one or more handles at the upper end are interconnected by right and left side folding connectors. Movement of respective front wheel supports and handle supports as the stroller frame is moved about a main folding axis ranges between a collapsed position and a deployed position and may or may not be coordinated by linkage or other mechanisms. A seat panel laterally spans between right and left sides and is connected to the front wheel supports. The seat panel includes a movable portion coupled to the seat panel. A back rest support frame is connected to the movable portion at a pivot axis that is spaced-apart from the juncture of the movable portion and the seat panel. Repositioning the movable portion from a first position to a second position reduces the spacing between the pivot axis and the main folding axis. The reduced axis spacing of the second position of the movable portion enables movement of the back rest support frame unimpeded by interference with transverse handles spanning between the handle supports. When the foldable portion is in the first position as it would be when the stroller frame is deployed for use, movement of the back rest support frame is impeded by interference with the handle.

Another objective is to provide a stroller having forwardly extending right and left side front wheel supports with at least one forwardly disposed wheel connector, rearwardly extending right and left side rear wheel supports with rearwardly disposed wheel connectors, and upwardly extending right and left side handle supports terminating in one or more handles at the upper end are interconnected by right and left side folding connectors to form a collapsible frame. Movement of respective front wheel supports, rear wheel supports, and handle supports as the stroller frame is moved between collapsed and deployed positions about at least one folding axis is coordinated either by the folding connectors or by link members interconnecting support members. A seat panel laterally spans between right and left sides and is connected to the front wheel supports. The seat panel includes a foldable portion that is pivotally coupled to the seat panel allowing the foldable portion to be positioned in a first manner wherein the seat panel and foldable portion form a lower seating surface for the stroller frame and a second manner wherein the foldable portion is upwardly angled in relation to the seat panel. A back rest support frame is connected to the foldable portion at a location that is spaced-apart from the pivot axis of the foldable portion pivot connection to the seat panel. Movement of the back rest support frame is unimpeded by transverse handles spanning between the handle supports when the foldable portion is positioned in the second manner. When the foldable portion is positioned in the first manner as it would be when the stroller frame is deployed for use, movement of the back rest support frame is impeded by interference with the handle.

These and other objectives are provided for by a foldable stroller frame having right and left front, right and left rear legs, and right and left handle supports joined at a right and left folding joints in a manner permitting folding movement about a folding axis between deployed and folded positions. A seat panel connects the front legs and includes a movable portion being movable between first and second positions. A seat back frame is connected to the movable portion at a seat back pivot. Spacing between the seat back pivot and the folding axis is dependent upon the position of the movable portion. When in the first position, the spacing is greatest and precludes frame folding due to interference between the seat back frame and a transverse element between the handle supports. When in the second position, spacing is minimized and frame folding is permissible without interference between the seat back frame and the transverse element.

Additional advantages and objectives of various aspects and embodiments of the present invention are discussed below.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "up" or "down," "right" or "left," or "top" or "bottom" are used as a matter of mere convenience, and are determined as the stroller would normally be pushed by a user across the floor or a similarly level surface while in an operating position. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Furthermore, when referring to the figures, like parts are numbered the same in all of the figures. Inclusion of an "R" or an "L" designation in conjunction with a reference number signifies an item shown on the right or left side of the stroller, respectively. Use of the reference number sans "R" or an "L" designation refers to the item generically without regard to a particular orientation.

Referring to figures, a foldable stroller frame 10 is shown in FIGS. 1 through 7 comprising forwardly extending right and left side front legs 12R, 12L with at least one forwardly disposed wheel connector 13, rearwardly extending right and left side rear legs 14R, 14L with rearwardly disposed wheel connectors, and upwardly extending right and left side handle supports 16R, 16L terminating in one or more handles 17 at the upper end. The legs and handle supports are interconnected by right and left side folding joints 20R, 20L to form the main portion of the collapsible stroller frame. Frame 10 is supported by one or more front wheels 3 and a pair of transversely spaced-apart rear wheels 5R, 5L disposed at the front and rear wheel connectors, respectively. The front wheel connector 13 permits the front wheels to swivel about a generally upstanding axis so that the stroller may be steered by a user. The rear wheels may be selectively removable to improve user convenience when storing the stroller.

Figure 1:
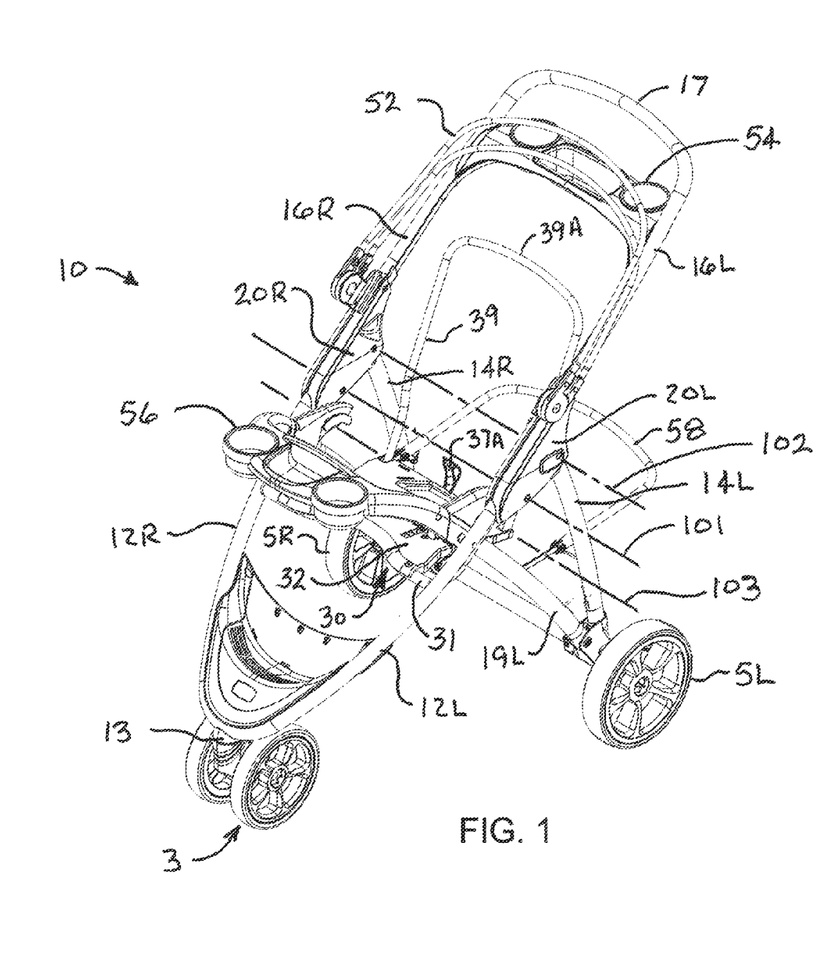
FIG. 1 is a perspective view of the frame of a folding stroller of the type on which the present invention is useful shown deployed for use.
Figure 2:
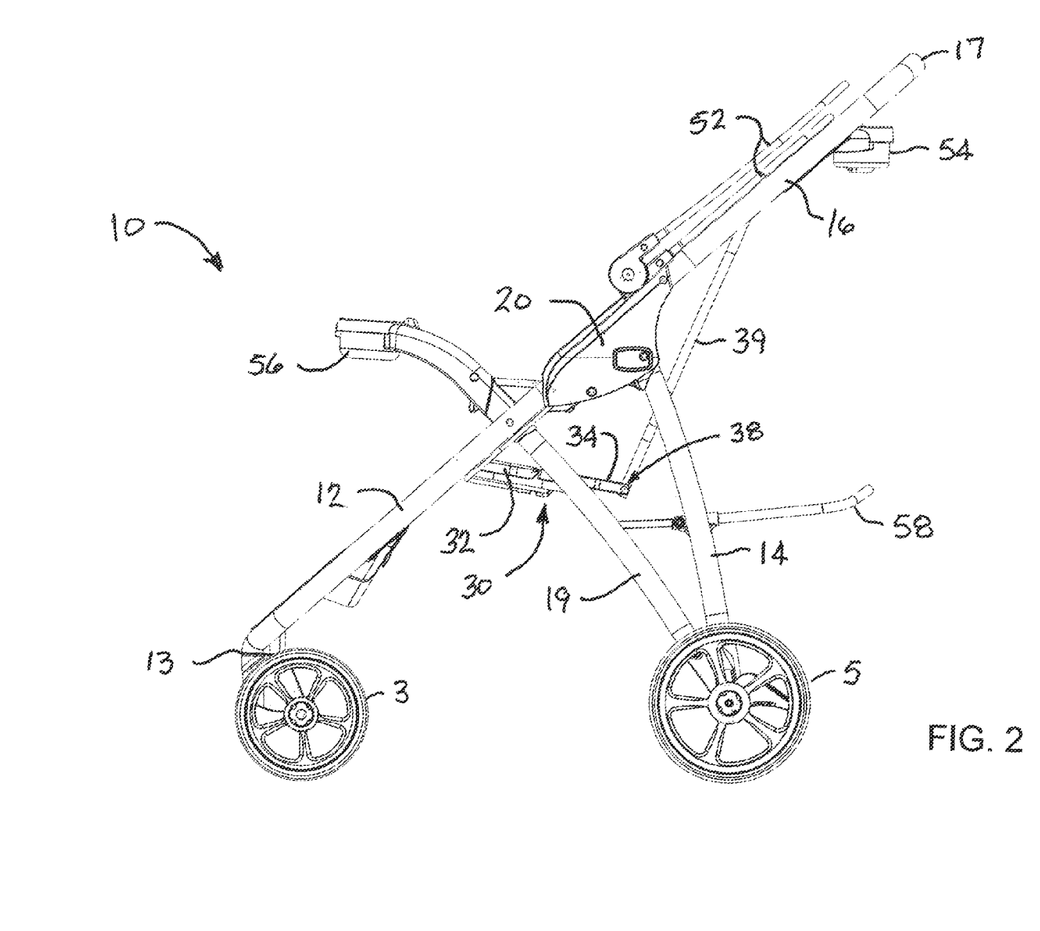
FIG. 2 is a side view of the stroller frame of FIG. 1.
Figure 4:
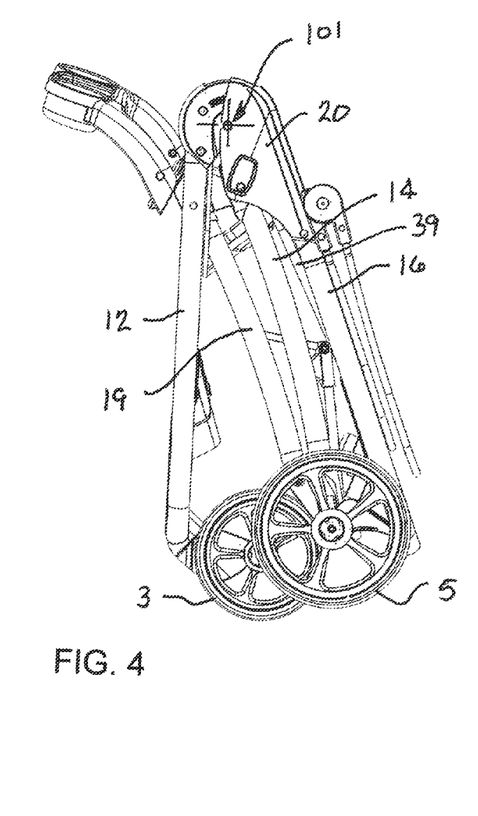
FIG. 4 is a side view of the stroller frame of FIG. 2 shown in a fully folded position.
Figure 5:
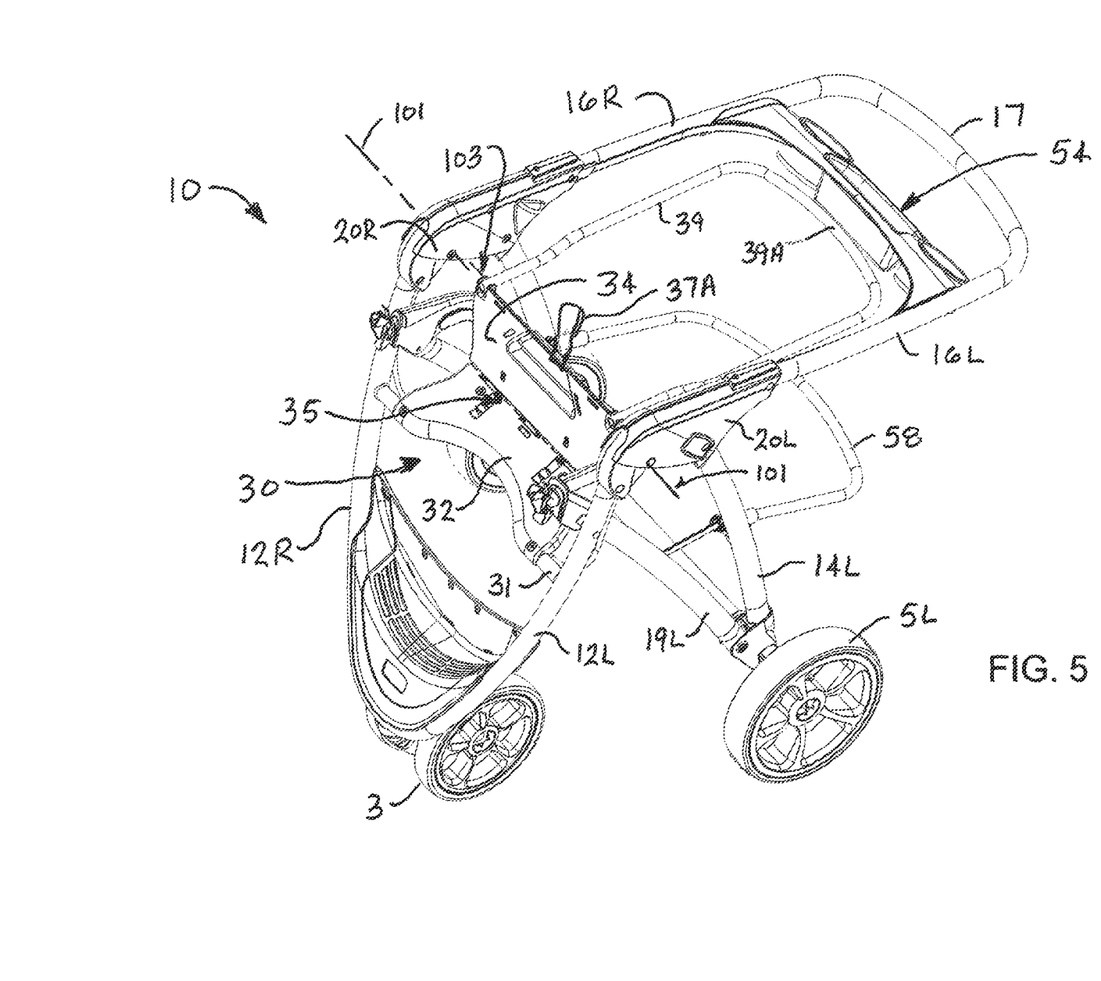
FIG. 5 is a second view of the stroller frame as shown in FIG. 3.
Figure 6:
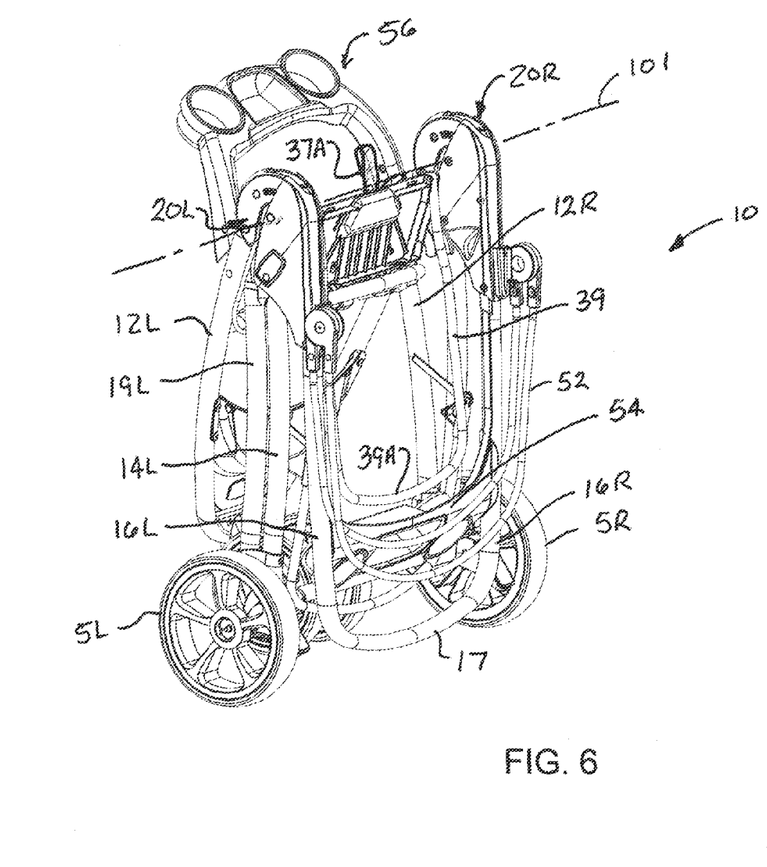
FIG. 6 is a second view of the stroller frame as shown in FIG. 4.
Figure 7:
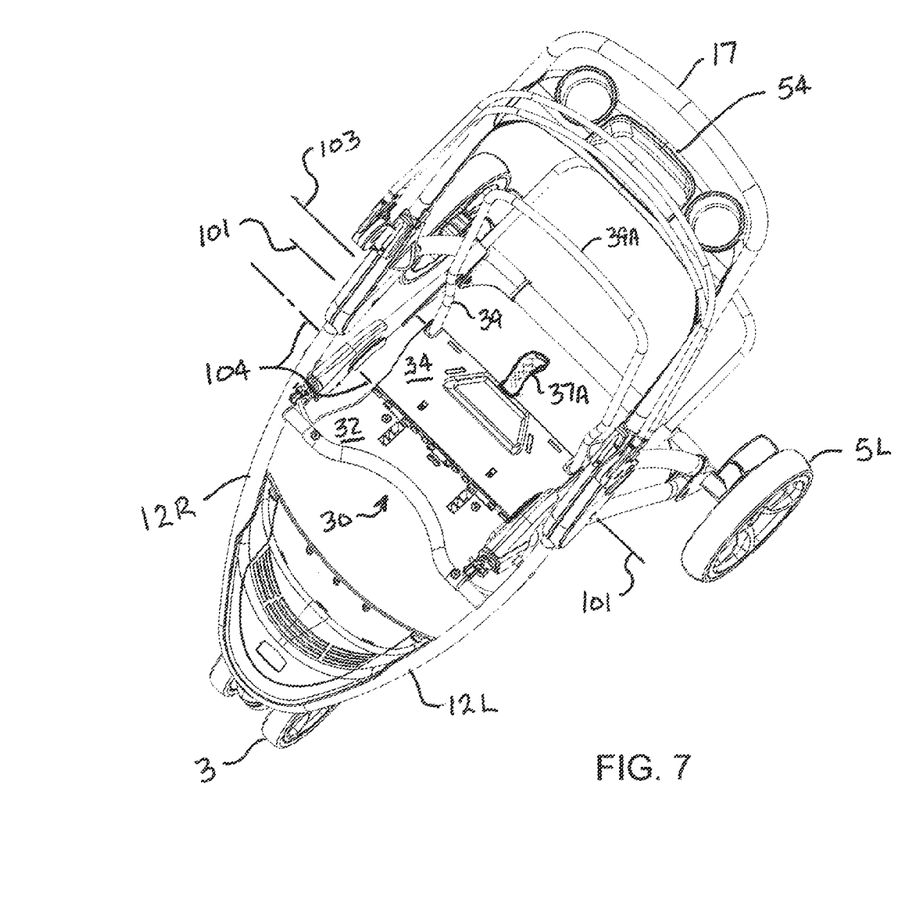
FIG. 7 shows the stroller frame of FIG. 1 viewed from above.

The folding joints 20R, 20L may include mechanisms to synchronize movement of respective front legs 12, rear legs 14, and handle supports 16 as the stroller frame 10 is moved between the deployed position, shown in FIG. 2, and the folded or collapsed position shown in FIG. 4. The folding joints 20R, 20L may also include multiple pivot axes and additional link members, such as right and left side links 19R, 19L shown in the figures, interconnecting the frame members in a manner to coordinate folding and unfolding movement of the frame. In the figures, the pivot axes include the main pivot axis 101 about which the front legs and handle supports pivot, also referred to herein as the stroller folding axis, and the rear pivot axis 102 about which the rear legs pivot.

Soft goods which normally cover the stroller frame and provide comfort for the occupant are not shown in the figures for clarity in the presentation.

It is common for the frame 10 to include additional features or accessories to enhance the convenience or utility of the stroller. Such features may include a sunshade support 52, a handlebar storage tray 54, an armrest tray 56, and/or a lower storage frame 58. The position of these features requires accommodation in the manner in which the stroller frame folds to prevent interference with various transverse frame members that could prevent the frame from being fully folded.

Figure 8:
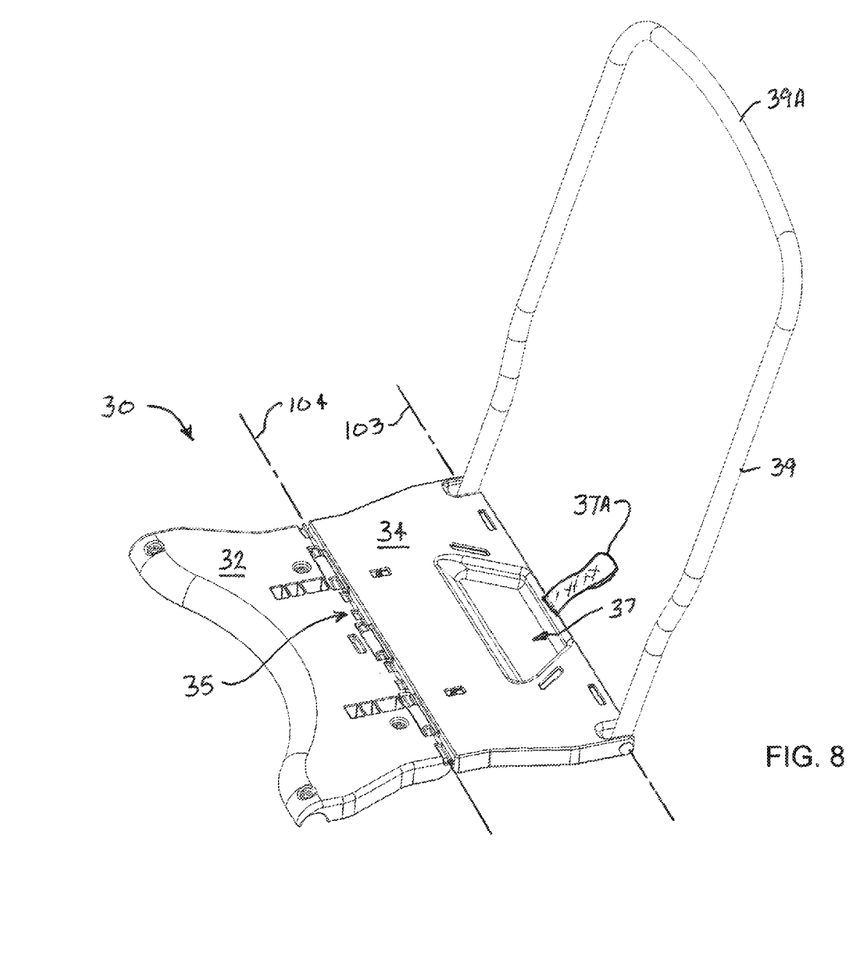
FIG. 8 illustrates the seat frame assembly from the stroller frame of the preceding figures.
Figure 9:
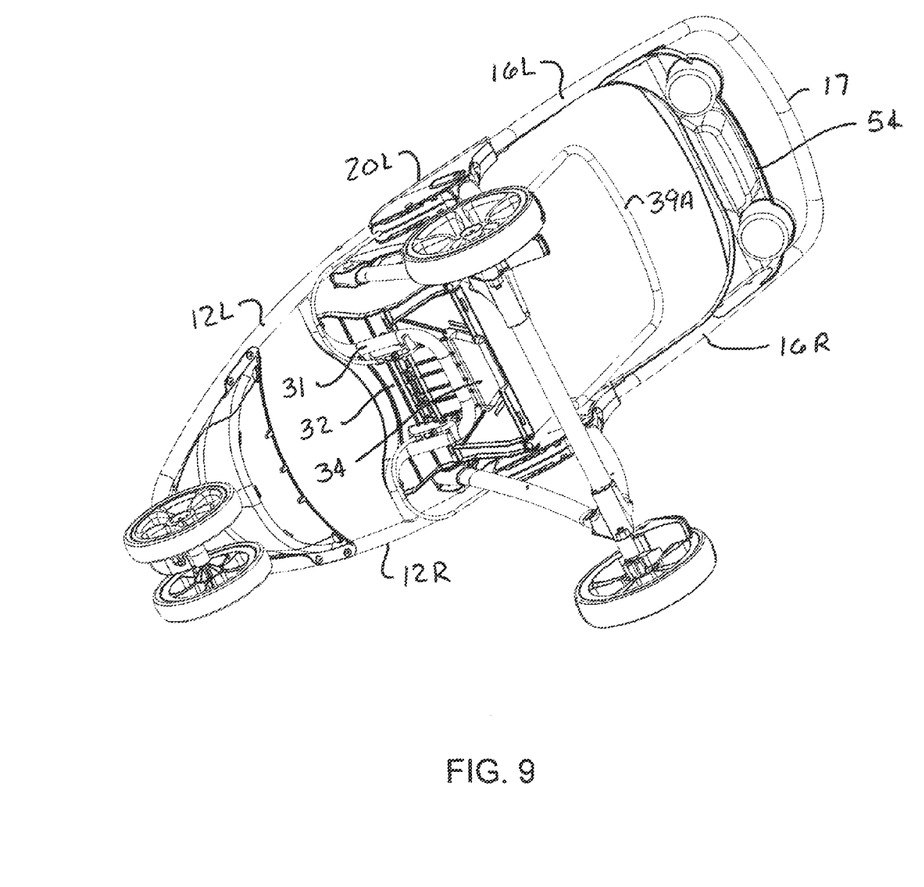
FIG. 9 shows the stroller frame viewed from below.

Referring to FIG. 8 in particular, the frame 10 further includes a seat assembly 30 comprising a seat frame 31 which spans between the right and left front legs 12R, 12L. The seat frame 31 is fixedly connected to the front legs so that the legs and seat frame move in unison during folding and unfolding operations. A seat panel 32 is connected to the seat frame 31 to provide a portion of a base for supporting an occupant of the stroller. The seat panel 32 further includes a movable seat portion 34 connected along a forward end to the seat portion 32 by a transversely aligned hinge 35. The hinge 35 allows the movable seat portion 34 is to pivot about transverse seat pivot axis 104 between a first position that is generally aligned with the seat panel 32 to form a generally flat surface for the seat base and a second position wherein the moveable seat portion 34 is upwardly angled in relation to the seat panel 32. The movable seat panel 34 is configured to freely move between the positions without a mechanism or linkage to manage the movement based on stroller frame folding position.

To the rearward end of the movable seat portion 34 is pivotally attached a backrest support frame 39 at pivot connectors 38 which allow pivoting about seatback pivot axis 103 which is generally parallel to the seat pivot axis 104. The backrest frame, seat panel and movable seat portion provide a framework for soft goods comprising the stroller seat.

In order to prevent the distal end 39A of back rest support 39 from impacting the handlebar storage tray 54 or the handlebar 17 during stroller frame folding, the moveable seat portion 34 is permitted to pivot upwardly about seat pivot axis 104. The movable seat portion 34 is configured to provide sufficient spacing between the seatback pivot axis 103 and the seat pivot axis 104 to allow the seat back pivot axis 103 to be moved over center of a plane passing through the seat pivot axis 104 and the innermost transverse element spanning the handlebar supports 16, such as handlebar storage tray 54, as the movable seat portion 34 is moved between the first (see FIG. 10) and second (see FIG. 11) positions. The plane, viewed on edge, is denoted as line "B" in FIGS. 10 and 11. Once the position of the seat back pivot axis 103 passes over center of plane "B", any pressure applied to the seatback frame 39 by a transverse member during folding movement of the stroller frame will cause the movable seat portion 34 to be pivoted further toward the second position and prevent the seatback frame from becoming jammed against the transverse member and preventing further folding movement.

Figure 10:
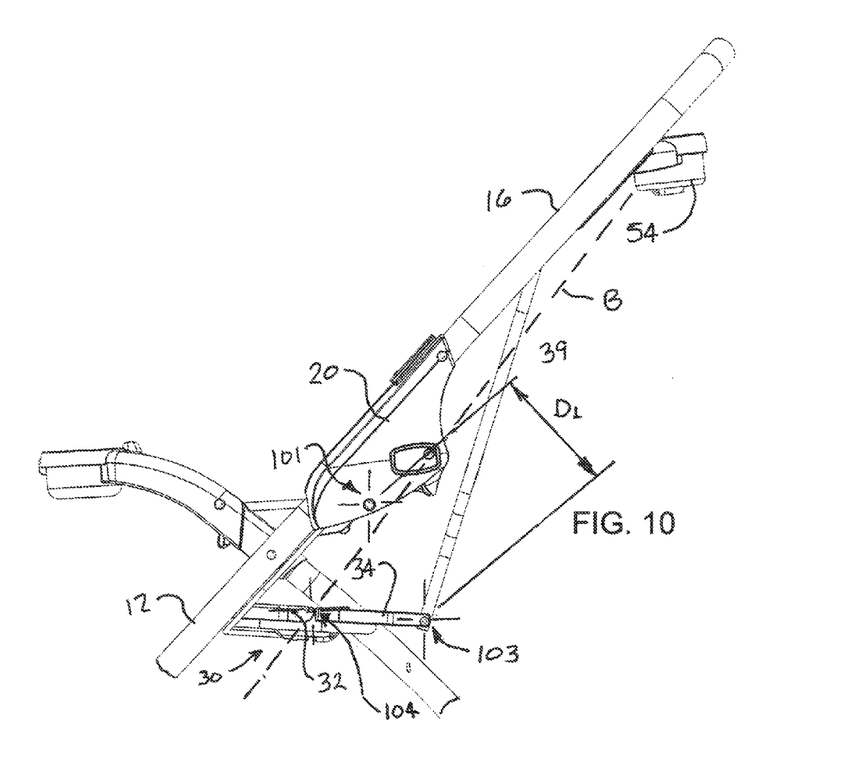
FIGS. 10 and 11 illustrate relative movement of the main and seat back pivot axes enabled by the present invention as the stroller is folded and unfolded.
Figure 11:
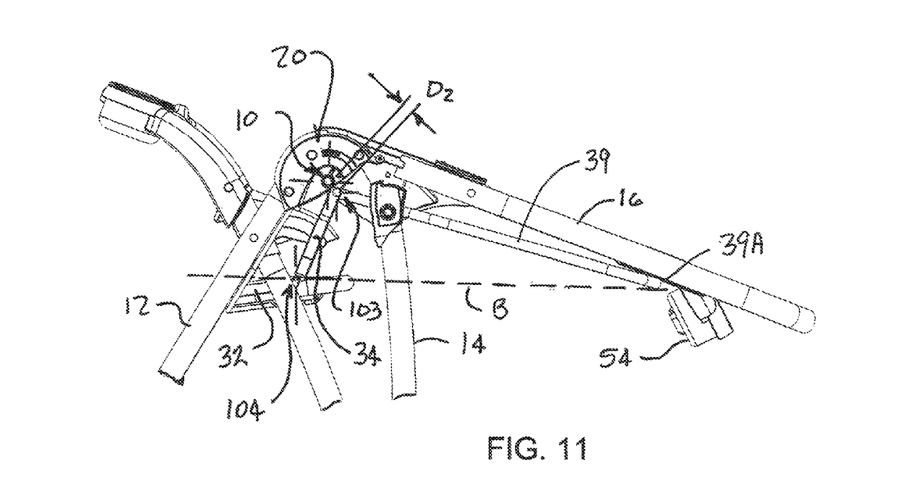

In many stroller configurations, such frame folding movement repositions the seatback pivot axis 103 upwardly and reduces the separation between the seatback pivot axis 103 and the main stroller pivot axis 102. Refer to FIGS. 10 and 11, wherein the separation is illustrated as distance $D_1$ when the stroller is unfolded and $D_2$ as the movable seat portion is moved to the second position as the stroller frame is folded. Moving the seatback pivot axis 103 closer to the main pivot axis 101 shortens the distance of the distal end 39A in relation to the radial distance to the handlebar storage tray 54 or the handlebar 17 as the stroller folds. Repositioning the seatback pivot axis 103 allows the back rest support frame to pivot unimpeded by the handlebar 17 or handlebar storage tray 54 if so equipped. It is noted that movement of the stroller certain stroller frame configurations The moveable seat portion 34 may include a grab structure 37 to aid in lifting and folding the stroller. A grab strap 37A or the like may also be attached to the movable seat portion 34 adjacent to seatback pivot axis 103 and extended through the soft goods to an accessible location within the seat. Lifting the moveable seat portion 34, whether by grab strap 37A or by the grab structure 37, begins the folding process by repositioning the movable seat portion and the seat back support frame 39 to increase clearance to the handle bar 17 or handlebar storage tray 54.

The folding movements are described in reference to FIGS. 2 through 6. Folding of the stroller frame from a deployed position (shown in FIG. 2) requires releasing a latching mechanism which secures the frame in the deployed position for use. Latching mechanisms are commonly used on folding strollers to prevent their movement, especially collapsing movement, while the stroller is in use. It is important to note that the latching mechanism discussed herein does not affect movement of the movable seat portion 34; it is coupled to the seat panel 32 in a manner that does not impede movement. Soft goods covering the stroller frame, the orientation of the seat assembly when the stroller is deployed, and the weight of an occupant keep the movable seat portion in position until the folding operation commences.

Figure 3:
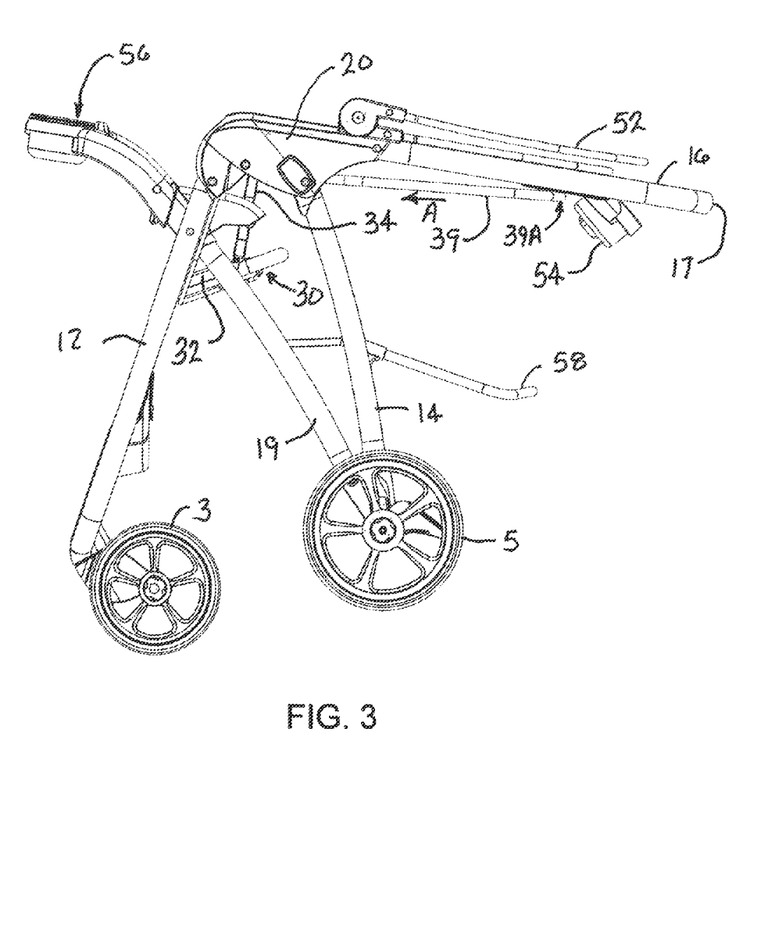
FIG. 3 is a side view of the stroller frame of FIG. 2 shown in a partially folded position.

Once the latching mechanism is released, the moveable seat portion 34 is lifted, preferably by pulling on the grab strap 37A, which pivots moveable portion 34 upwardly, counter-clockwise when viewed in the figures, and into an angled relationship with seat panel 32. Seat panel 32 is fixedly connected to the front legs and is pivoted in a counter-clockwise direction along with the front legs 12 and resulting rotation of the seat frame 31 (FIG. 3). Continued elevation of the grab strap 37A elevates the seat assembly in general allowing the front legs 12 and handle supports 16 to pivot about the main pivot axis 101, the front legs 12 pivoting in a generally counter-clockwise direction while the handle supports 16 pivot in a generally clockwise direction toward a generally parallel orientation (FIG. 4). As the handle supports move downwardly, the back rest support 39 moves downwardly as well, pivoting generally clockwise about seatback pivot axis 103.

The initial pivoting movement of the movable seat portion 34 repositions the seatback pivot connectors 38 and backrest pivot axis 103 moving the distal end 39A of back rest support frame 39 generally radially inwardly (FIG. 3, arrow "A") so that the distal end 39A of the back rest support 39 may be pivoted without contacting any transverse members connected to the handle supports 16, such as the handlebar storage tray 54 or the handlebar 17. Once the position of the seat back pivot axis 103 passes over center of plane "B", any contact between the seatback frame 39 and the transverse member during folding movement of the stroller frame causes additional pivoting of the movable seat portion 34 and prevents the seatback frame 39 from becoming jammed against the transverse member 54. If the movable seat portion 34 remains in the first position aligned with the seat panel, the back rest support 39 cannot pivot fully due to interference with the transverse members connected to the handle supports 16.

Unfolding the frame 10 occurs in the reverse wherein the handle supports 16 pivot counter-clockwise while the front legs 12 pivot clock clockwise in relation to the folding joints 20. The movable seat portion 34, being free to move between the first and second positions, will be moved toward the second (angled) position as the back rest support 39 contacts any transverse members extending between the handle supports 16 until the handle supports 16 have pivoted an amount sufficient to position them generally above the back rest support 39.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

I claim:

1. A foldable stroller frame comprising:
   right and left side spaced apart front legs and right and left side spaced apart handle extensions;
   right and left side folding joints connecting respective front legs and handle extensions in a manner enabling pivotal movement about a first axis;
   a seat panel fixedly connecting the right and left side front legs for movement in unison therewith;
   a moveable seat portion connected to the seat panel, the movable seat portion being moveable between a first position and a second position; and
   a seat back frame connected to the movable seat portion and pivotal about a second axis generally parallel to and spaced apart from the first axis, spacing between the first and second axes being reduced as the movable seat portion is moved from the first position to the second position.

2. The stroller frame of claim 1, wherein the moveable seat portion is generally aligned with the seat panel when in the first position and angled upwardly from the seat panel when in the second position.

3. The stroller frame of claim 2, wherein the movable seat portion connection to the seat panel is configured to freely pivot between the first position and the second position.

4. The stroller frame of claim 3, further comprising at least one transverse member connecting the right and left side handle extensions at a position spaced apart from the first axis, wherein the folding joints enable movement between folded and deployed positions, and wherein pivoting of the seat back frame as the stroller frame is being moved toward the folded position is impeded by the at least one transverse member when the moveable seat portion is in the first position, pivoting of the seat back frame as the stroller frame is being moved toward the folded position being unimpeded by the at least one transverse member when the moveable seat portion is in the second position.

5. The stroller frame of claim 4, wherein the first transverse member is a handlebar connecting the right and left side handle extensions.

6. The stroller frame of claim 4, wherein the first transverse member is an accessory tray spanning between the right and left side handle extensions.

7. A foldable stroller frame comprising:
   right and left side spaced apart front legs;
   right and left side spaced apart handle extensions;
   right and left folding joints connecting respective front legs and handle extensions in a manner enabling movement thereof about at least one folding axis between folded and deployed positions;
   a first transverse member connecting the right and left side handle extensions;
   a seat panel connecting the right and left side front legs, the seat panel defining a generally planar seating surface;
   a moveable seat portion connected to the seat panel and moveable between a first position generally aligned with the seat panel and a second position angled in relation to the seat panel; and a seat back frame moveably connected to the moveable seat portion, movement of the seat back frame as the stroller frame is being moved toward the folded position being unimpeded by the first transverse member when the moveable seat portion is in the second position, movement of the seat back frame as the stroller frame is being moved toward the folded position being impeded by the first transverse member when the moveable seat portion is in the first position.

8. The stroller frame of claim 7, wherein the movable seat portion connection to the seat panel is a transversely aligned hinge connector.

9. The stroller frame of claim 8, wherein the moveable connection between the seat back frame and the moveable seat portion is a transversely aligned pivot connector having a seat back pivot axis that is spaced apart from and generally parallel to the hinge connector.

10. The stroller frame of claim 9, wherein the movable seat portion pivoting connector is configured to freely pivot between the first and second positions.

11. The foldable stroller of claim 10, wherein the separation between the seat back pivot axis and the at least one folding axis is reduced as the movable seat portion is moved from the first position to the second position.

12. The stroller frame of claim 11, wherein the first transverse member is an accessory tray spanning between the right and left side handle extensions.

13. The stroller frame of claim 11, wherein the first transverse member is a handlebar connecting the right and left side handle extensions.

14. A foldable stroller frame comprising:
right and left side spaced apart front legs, right and left side spaced apart rear legs, and right and left side spaced apart handle extensions;
right and left folding joints connecting respective front legs, rear legs, and handle extensions in a manner enabling movement thereof about at least one folding axis between folded and deployed positions;
a first transverse member connecting the respective right and left side handle extensions;
a seat panel connecting the right and left front legs, the seat panel defining a generally planar seating surface;
a moveable seat portion hingedly connected to the seat panel at a transverse seat pivot axis and moveable between a first position that is generally planarly aligned with the seat panel and a second position that is angled in relation to the seat panel; and
a seat back frame pivotally connected to the moveable seat portion at a seat back pivot axis that is generally parallel to and spaced apart from the seat pivot axis, the position of the seat back pivot axis being moved overcenter of a plane extending from the seat pivot axis to the transverse member as the movable seat portion is moved from the first position to the second position.

15. The stroller frame of claim 14, wherein the hinged connection between the movable seat portion connection and the seat panel is configured to freely pivot between the first position and the second position.

16. The stroller frame of claim 15, wherein movement of the seat back pivot axis overcenter of the plane repositions the seat back frame as the stroller frame is folded for unimpeded movement thereof, whereas the transverse member impedes movement of the seat back frame as the stroller frame is folded when the seat back pivot axis is disposed on a side of the plane opposite of the at least one folding axis.

17. The stroller frame of claim 16, wherein the first transverse member is an accessory tray spanning between the right and left side handle extensions.

18. The stroller frame of claim 16, wherein the first transverse member is a handlebar connecting the right and left side handle extensions.

* * * * *